(12) United States Patent
Bargheer et al.

(10) Patent No.: US 6,604,785 B2
(45) Date of Patent: Aug. 12, 2003

(54) MOTOR VEHICLE SEAT

(75) Inventors: Claudio Bargheer, Stuttgart (DE); Peter Nordberg, Graz (AT); Vasilios Orizaris, Renningen (DE); Karl Pfahler, Stuttgart (DE); Lother Renner, Nufringen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/985,180

(22) Filed: Nov. 1, 2001

(65) Prior Publication Data

US 2002/0057006 A1 May 16, 2002

(30) Foreign Application Priority Data

Nov. 1, 2000  (DE) .......................................... 100 54 010

(51) Int. Cl.$^7$ ................................................. A47C 7/72
(52) U.S. Cl. ............................ 297/180.14; 297/180.13; 297/452.42; 454/120
(58) Field of Search ..................... 297/180.1, 180.13, 297/180.14, 410, 180.11, 452.42, 217.1; 454/120, 907, 90

(56) References Cited

U.S. PATENT DOCUMENTS

| 2,731,542 A | * | 1/1956 | Daniels .................. 297/180.11 |
| 2,976,700 A | * | 3/1961 | Jackson .................. 297/180.11 |
| 3,948,379 A | * | 4/1976 | Warner .......................... 194/9 |
| 5,370,439 A | * | 12/1994 | Lowe et al. ........... 297/180.11 |
| 5,927,817 A | * | 7/1999 | Ekman et al. ......... 297/452.47 |
| 6,062,641 A | * | 5/2000 | Suzuki et al. ............ 297/180.1 |
| 6,189,966 B1 | * | 2/2001 | Faust et al. ............ 297/180.14 |
| 6,277,023 B1 | * | 8/2001 | Schwarz ..................... 454/120 |

FOREIGN PATENT DOCUMENTS

DE          19654370 C1      1/1998

* cited by examiner

Primary Examiner—Peter M. Cuomo
Assistant Examiner—Stephanie Harris
(74) Attorney, Agent, or Firm—Crowell & Moring LLP

(57) ABSTRACT

A motor vehicle seat for an open-top motor vehicle has a seat cushion part and a backrest which is provided with a pertaining headrest. In an upper area of the backrest, for reducing undesirable draft phenomena for a seat occupant, at least one air outflow device which has an assigned air outflow nozzle of an air supply device is arranged. The air outflow device is vertically adjustable with respect to the backrest and can be secured in an adjusted vertical position.

12 Claims, 4 Drawing Sheets

MOTOR VEHICLE SEAT

This application claims the priority of German application 100 54 010.4, filed Nov. 1, 2000, the disclosure of which is expressly incorporated by reference herein.

This application is also generally related to U.S. patent application Ser. No. 09/985,186, titled "AUTOMOBILE SEAT", filed on the same day as the present application.

BACKGROUND AND SUMMARY OF THE INVENTION

The present invention relates to a motor vehicle seat for an open-top motor vehicle, including a seat cushion part, a backrest which is provided with a pertaining headrest, and at least one air outflow device arranged in an upper area of the backrest for reducing undersirable draft phenomena for a seat occupant, and in which the air outflow device has an assigned air outflow nozzle of an air supply device.

A motor vehicle seat of this type for open-top motor vehicles is known from German Patent Document DE 196 54 370 C1. This motor vehicle seat includes a seat cushion part and a backrest equipped with a pertaining headrest. In order to reduce undesirable draft phenomena for a seat occupant when driving with the top down, several air outflow devices, which have respectively assigned air outflow nozzles of an air supply system, are arranged between the backrest and the headrest. It is considered disadvantageous that, with this known motor vehicle seat, air currents flowing out of the air outflow devices cannot be adapted, or can be adapted only to a very limited extent, to requirements of different seat occupants.

It is therefore an object of the invention to provide a motor vehicle seat of the type mentioned with an air current flowing out of at least one air outflow device which can be better adapted to the requirements of different seat occupants.

According to the invention, this object is achieved by way of a vehicle seat in which the air outflow device can be vertically adjusted with respect to the backrest into an adjusted vertical position, and secured in the adjusted vertical position.

Advantageous features and expedient further developments of the invention are reflected in the claims.

In a motor vehicle seat according to the invention, at least one air outflow device is vertically adjustable with respect to the backrest and, as a result, the air current exiting from the air outflow device can be optimally adapted to the sizes and the requirements of different seat occupants. Preferably, the air outflow device can be adjusted and secured at a height at which the head, shoulder, and neck region of a seat occupant can be optimally supplied with warm air.

It was found to be particularly advantageous to couple vertical adjustment of the air outflow device to vertical adjustment of the headrest. Consequently, in an optimal headrest position, an optimal position of the air outflow device or an optimal alignment of the air current exiting therefrom relative to the head, shoulder, and neck region of the seat occupant can also be achieved.

The air current from an air outflow device which is integrated in the headrest was found to be particularly effective. As a result of this integration, coupling between vertical adjustment of the headrest and the vertical adjustment of the air outflow device can be implemented in a simple manner.

Vertical adjustment of an air outflow device with respect to a supply duct of an air supply device can take place in a simple manner by way of a telescopic sliding guide for the two components. As an alternative, for example, it is conceivable to connect the air outflow device with the supply duct by way of bellows permitting vertical adjustment of the air outflow device.

Additional advantages, characteristics, and details of the invention are found in the following description as well in the drawings.

DETAILED DESCRIPTION OF THE INVENTION

Figure 1:
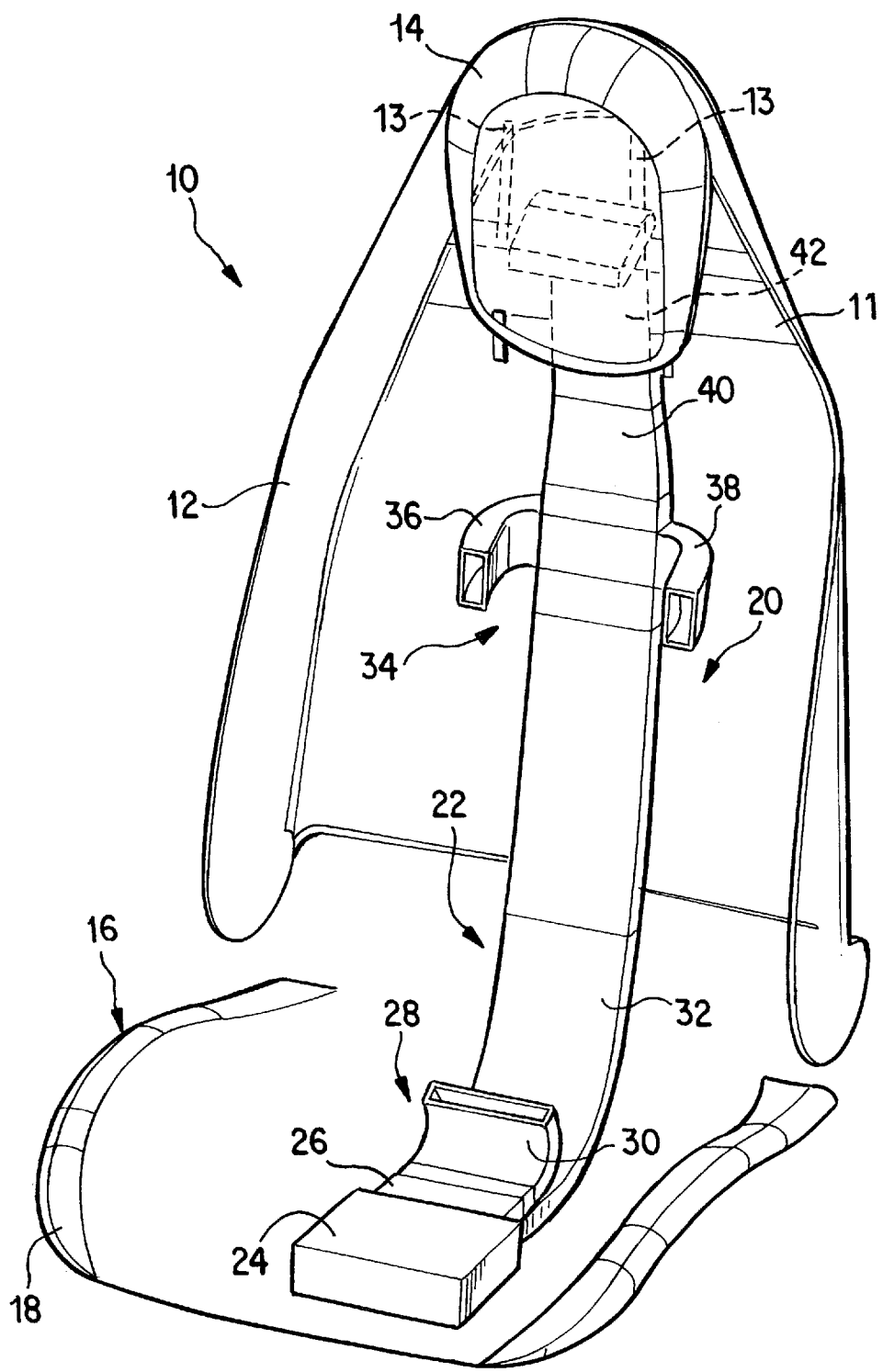
FIG. 1 is a schematic perspective frontal view of a motor vehicle seat according to the invention, in which an air supply device is arranged, which has an upper air outflow device integrated in a headrest.
Figure 2:
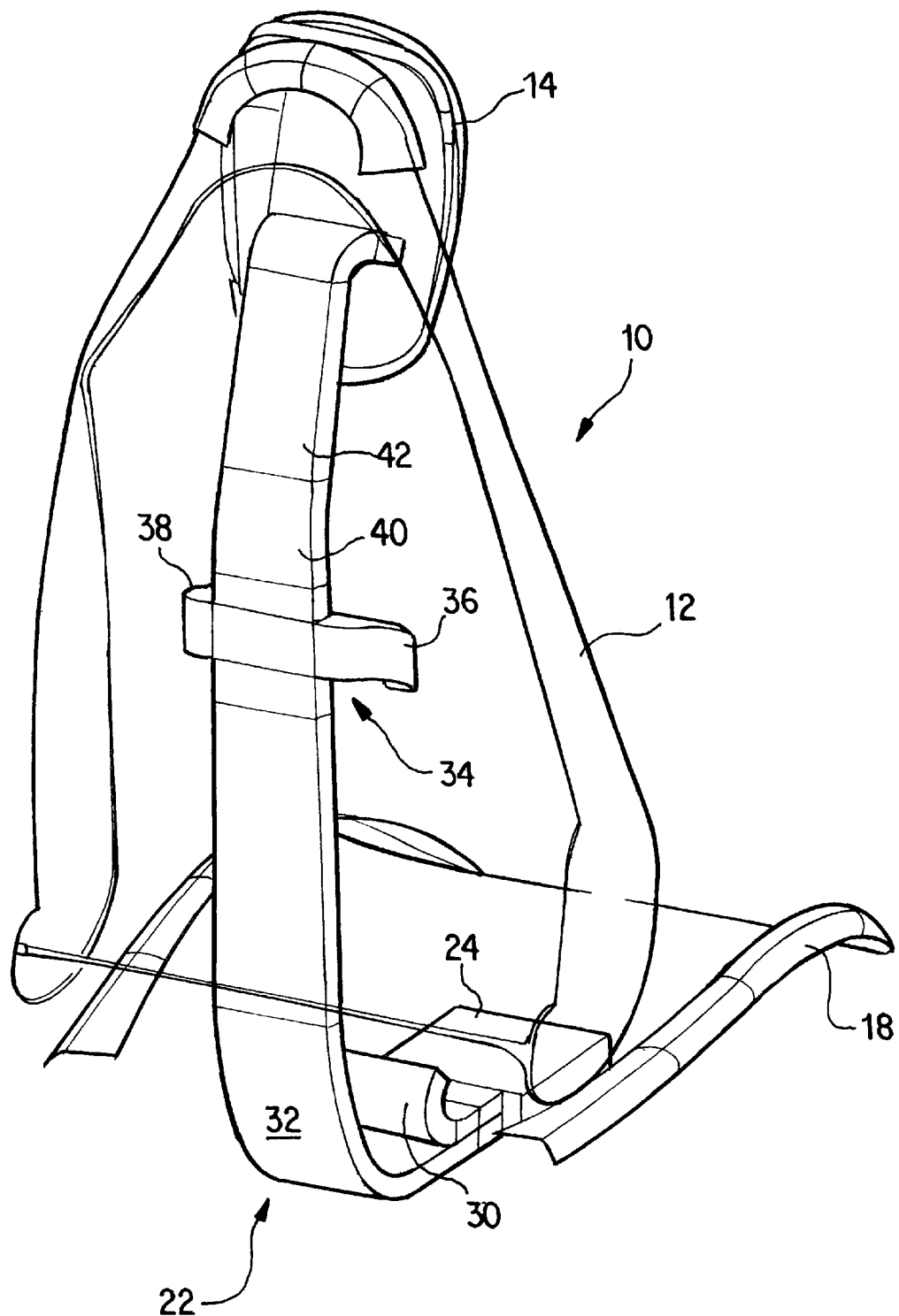
FIG. 2 is a schematic perspective rear view of the motor vehicle seat of FIG. 1.

FIGS. 1 and 2 show schematic perspective frontal and rear views of a motor vehicle seat of an open-top motor vehicle. A backrest frame 12 and a vertically adjustable headrest 14 of a backrest 10 are illustrated here. By way of guide rods 13, outlined by broken lines, the headrest 14 is vertically adjustably held on a guiding device 11 which is fixedly connected with the backrest frame 12. Only a lower frame 18 of the seat cushion part 16 is shown. An air supply device 20, which comprises a duct arrangement 22, is integrated in the backrest 10 and the seat cushion part 16 of the motor vehicle seat. A fan 24, accommodated by a housing, is connected here in front of the duct arrangement 22. Air intake of the fan 24 takes place at the bottom side of the seat cushion part 16. On the delivery side of the fan 24, the air current arrives at a heating element 26 which can be connected, and by means of which the air current can be moderated as desired, by the seat occupant. A distributing device 28 is connected behind the heating element 26. The air current, depending on the adjustment by the vehicle occupant, can be distributed to a lower partial duct 30 and/or an upper partial duct 32 by way of the distributing device 28. The lower partial duct 30 is used to supply air outflow openings, which are not shown, in the seat cover of the seat cushion part 16. These air outflow openings are used for heating or ventilating the seat. Shut-off elements and/or guiding devices are provided in the partial ducts 30 and 32 for adjusting the partial air flows. In this context, it is also conceivable to arrange a separate heating element 26 or, as an alternative, a cooling element in each partial duct 30, 32. At approximately half the height of the backrest 10, another distributing device 34 is arranged. Air flowing through the partial duct 32 can be branched off by the other distributing device to two partial ducts 36 and 38 for supplying air outflow openings in the seat covering of the backrest 10, which is not shown. Alternatively, air can be distributed by way of a supply duct 40 to supply air to an air outflow device 42 in the headrest, indicated by a broken line. For adjusting the partial air flows in the partial ducts 36, 38, and 40, shut-off elements are also provided here. In the top view, the two partial ducts 36 and 38 have an essentially U-shaped construction. The air outflow openings, not shown here, in the seat cover of the backrest 10 are used for heating or ventilating the seat. The air outflow device 42 in the headrest 14 is used for reducing draft phenomena which occur when driving with the top down.

Figure 3:
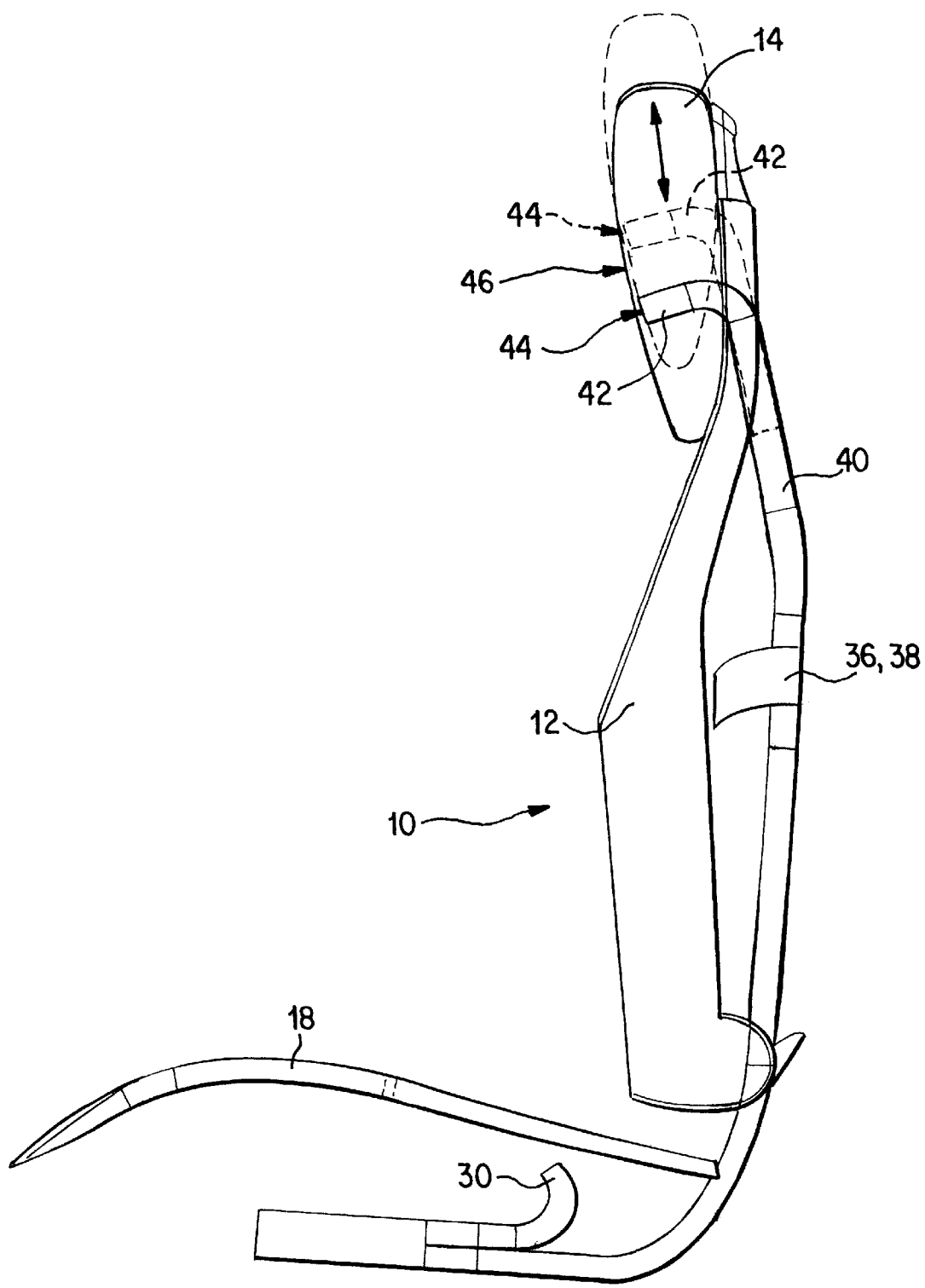
FIG. 3 is a schematic lateral view of the motor vehicle seat of FIGS. 1 and 2.

FIG. 3, which is a schematic lateral view of the motor vehicle seat shown in FIGS. 1 and 2, illustrates that the air outflow device 42 ends with its air outflow nozzle 44 integrated approximately surface-flush in the headrest 14 on its frontal side 46. In this case, the air outflow device 42 is fastened, in the area of the air outflow nozzle 44, with its forward upper end at the headrest 14. Fastening can, for example, be implemented by foaming the forward end of the air outflow device 44 into the padding of the headrest 14. It is also possible to fasten the air outflow device 42 by way of its forward end on the headrest 14 with other fastening devices. As a result, the air outflow device 42 or the air outflow nozzle 44 is coupled relative to movement of the vertically adjustable headrest 14 such that, after the adaptation of the headrest 14, the air outflow nozzle 44 is also in an optimal position with respect to the head of a vehicle occupant, and the air current exiting from the air outflow nozzle 44 is optimally directed at the head and neck region of a vehicle occupant. The headrest 14 and the air outflow device 42 integrated in the latter are shown by way of solid lines in a lower position and by way of broken lines in a position vertically adjusted upward. In this case, the air outflow device 42, by way of its lower end, is illustrated as being telescopically vertically displaceable with respect to the supply duct 40 of the air supply device 20. The air outflow device, therefore, can follow the vertical adjustment of the headrest 14. In the embodiment illustrated here, the headrest 14 and the air outflow device 42 are secured by way of the guiding device 11 (FIG. 1) vertically adjustably accommodating the guide rods 13.

Figure 4:
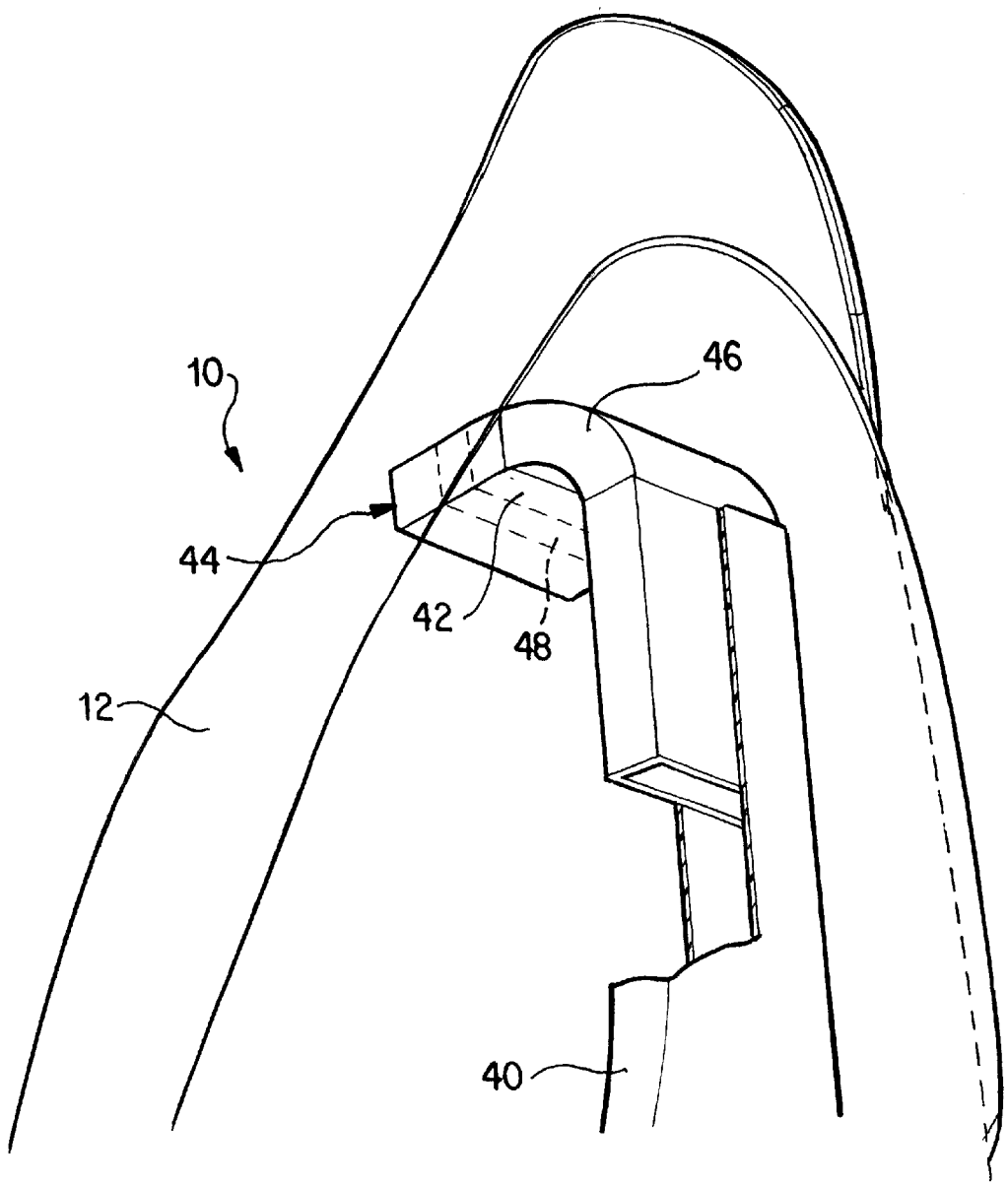
FIG. 4 is a schematic perspective rear view of the upper area of the backrest and of the air supply device in the seat of FIGS. 1 to 3 in which the air outflow device, integrated in the headrest, can be telescopically vertically displaced with respect to the supply duct.

FIG. 4 is an enlarged representation of a schematic perspective rear view of the upper area of the backrest 10 and of the air supply device 20 according to FIGS. 1 to 3. The air outflow device 42 is integrated by means of its forward end into the headrest 14, not shown here, and is accommodated by a sliding guide telescopically within the supply duct 40. For the purpose of clarity, the supply duct is illustrated as being cut open at its upper end. The sliding guide has an airtight construction. Connection of the air outflow device 42 with the supply duct 40 could be by way of bellows instead of a sliding guide. The corner area 46 of the air outflow device 42 may have a flexible design in order to permit adjustment of the inclination of the headrest 14. If a headrest 14 is provided with a width which can be changed in the longitudinal direction of the vehicle, an additional sliding guide or another bellows 48, indicated by a broken line, may be provided. The air outflow nozzle is shown here as having a rectangular outflow cross-section.

It is also within the scope of the invention to arrange the air outflow device outside the headrest instead of integrating the device in the headrest. In this case, the adjusted vertical position of the air outflow device can be secured by separate securing devices.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A motor vehicle seat for an open-top motor vehicle comprising:
   a seat cushion part,
   a backrest which is provided with a pertaining headrest, and
   at least one air outflow device arranged in an upper area of the backrest, said air outflow device having an assigned air outflow nozzle of an air supply device,
   wherein the air outflow device can be vertically adjusted with respect to the backrest into an adjusted vertical position and can be secured in the adjusted vertical position,
   wherein the headrest is vertically adjustably arranged on the backrest, and
   wherein vertical adjustment of the air outflow device is coupled relative to movement with vertical adjustment of the headrest.

2. A motor vehicle seat for an open-top motor vehicle comprising:
   a seat cushion part,
   a backrest which is provided with a pertaining headrest, and
   at least one air outflow device arranged in an upper area of the backrest, said air outflow device having an assigned air outflow nozzle of an air supply device,
   wherein the air outflow device can be vertically adjusted with respect to the backrest into an adjusted vertical position and can be secured in the adjusted vertical position, and
   wherein, at least in an area of the air outflow nozzle, the air outflow device is integrated in the headrest and an outflowing air current is adapted to be directed at a head and neck region of a seat occupant.

3. The motor vehicle seat according to claim 2, wherein the air outflow device ends at a forward side of the headrest adapted to face the head of the seat occupant.

4. A motor vehicle seat for an open-top motor vehicle comprising:
   a seat cushion part,
   a backrest which is provided with a pertaining headrest, and
   at least one air outflow-device arranged in an upper area of the backrest, said air outflow device having an assigned air outflow nozzle of an air supply device,
   wherein the air outflow device can be vertically adjusted with respect to the backrest into an adjusted vertical position and can be secured in the adjusted vertical position, and
   wherein the air outflow device is telescopically vertically displaceable with respect to a supply duct of the air supply device.

5. The motor vehicle seat according to claim 1, wherein, at least in an area of the air outflow nozzle, the air outflow device is integrated in the headrest and an outflowing air current is adapted to be directed at a head and neck region of a seat occupant.

6. The motor vehicle seat according to claim 5, wherein the air outflow device ends at a forward side of the headrest adapted to face the head of the seat occupant.

7. A process of adjusting at least one airflow device arranged in an upper area of a backrest of a motor vehicle seat for an open-top motor vehicle, the motor vehicle seat having a seat cushion part, a pertaining headrest with which the backrest is provided, and an assigned air outflow nozzle of an air supply device, comprising:
   adjusting the air outflow device vertically with respect to the backrest into an adjusted vertical position, and securing the air outflow device in the adjusted vertical position, wherein the headrest is vertically adjustably arranged on the backrest, and wherein vertical adjustment of the air outflow device is coupled relative to movement with vertical adjustment of the headrest.

8. A process of adjusting at least one airflow device arranged in an upper area of a backrest of a motor vehicle seat for an open-top motor vehicle, the motor vehicle seat having a seat cushion part, a pertaining headrest with which the backrest is provided, and an assigned air outflow nozzle of an air supply device, comprising:

adjusting the air outflow device vertically with respect to the backrest into an adjusted vertical position, and securing the air outflow device in the adjusted vertical position, wherein, at least in an area of the air outflow nozzle, the air outflow device is integrated in the headrest and an outflowing air current is adapted to be directed at a head and neck region of a seat occupant.

9. The process according to claim 8, wherein the air outflow device ends at a forward side of the headrest adapted to face the head of the seat occupant.

10. A process of adjusting at least one airflow device arranged in an upper area of a backrest of a motor vehicle seat for an open-top motor vehicle, the motor vehicle seat having a seat cushion part, a pertaining headrest with which the backrest is provided, and an assigned air outflow nozzle of an air supply device, comprising:

adjusting the air outflow device vertically with respect to the backrest into an adjusted vertical position, and securing the air outflow device in the adjusted vertical position, wherein the air outflow device is telescopically vertically displaceable with respect to a supply duct of the air supply device.

11. The process according to claim 7, wherein, at least in an area of the air outflow nozzle, the air outflow device is integrated in the headrest and an outflowing air current is adapted to be directed at a head and neck region of a seat occupant.

12. The process according to claim 11, wherein the air outflow device ends at a forward side of the headrest adapted to face the head of the seat occupant.

* * * * *